(12) United States Patent
Cannon (10) Patent No.: US 7,164,440 B2
(45) Date of Patent: Jan. 16, 2007

(54) DYNAMIC IMAGE ADAPTATION METHOD FOR ADJUSTING THE QUALITY OF DIGITAL PRINTS

(75) Inventor: Greg L Cannon, Boynton Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 432 days.

(21) Appl. No.: 10/375,088

(22) Filed: Feb. 28, 2003

(65) Prior Publication Data

US 2004/0170303 A1    Sep. 2, 2004

(51) Int. Cl.
    *H04N 5/235*    (2006.01)
(52) U.S. Cl. .................................... 348/229.1
(58) Field of Classification Search ........... 348/222.1, 348/229.1, 370–371, 350; 382/115, 124–127, 382/168–172, 256, 291, 312
    See application file for complete search history.

(56) References Cited

U.S. PATENT DOCUMENTS

| | | | |
|---|---|---|---|
| 2,500,017 A | 3/1950 | Altman | |
| 3,200,701 A | 8/1965 | White | |
| 3,475,588 A | 10/1969 | McMaster | |
| 3,482,498 A | 12/1969 | Becker | |
| 3,495,259 A | 2/1970 | Rocholl et al. | |
| 3,527,535 A | 9/1970 | Monroe | |
| 3,540,025 A | 11/1970 | Levin et al. | |
| 3,617,120 A | 11/1971 | Roka | |
| 3,699,519 A | 10/1972 | Campbell | |
| 3,906,520 A | 9/1975 | Phillips | |
| 3,947,128 A | 3/1976 | Weinberger et al. | |
| 3,968,476 A | 7/1976 | McMahon | |
| 3,975,711 A | 8/1976 | McMahon | |
| 4,032,975 A | 6/1977 | Malueg et al. | |
| 4,063,226 A | 12/1977 | Kozma et al. | |

(Continued)

FOREIGN PATENT DOCUMENTS

EP     0 101 772 A1    3/1984

(Continued)

OTHER PUBLICATIONS

Btt (Biometric Technology Today), Finger technologies contacts, 2 pages.

(Continued)

*Primary Examiner*—Vivek Srivastava
*Assistant Examiner*—James M. Hannett
(74) *Attorney, Agent, or Firm*—Sterne, Kessler, Goldstein & Fox P.L.L.C.

(57) ABSTRACT

A dynamic image adaptation system and method for adjusting the quality of digital prints. The system includes an illumination source that illuminates an imaging surface of a live scanner optical system, the live scanner optical system scanning a biometric object placed on the imaging surface, a camera for capturing the print image of the biometric object placed on the imaging surface, a memory that stores data generated in the system, and a controller that adaptively controls at least one of the illumination source or the camera to obtain the print image with the predetermined quality. The controller adaptively controls the camera and the illumination source by adjusting one or more of contrast, gain, and integration time for the camera, and illumination for the illumination source.

18 Claims, 6 Drawing Sheets

U.S. PATENT DOCUMENTS

| | | | |
|---|---|---|---|
| 4,120,585 A | 10/1978 | DePalma et al. | |
| 4,152,056 A | 5/1979 | Fowler | |
| 4,209,481 A | 6/1980 | Kashiro et al. | |
| 4,210,889 A | 7/1980 | Swonger et al. | |
| 4,253,086 A | 2/1981 | Szwarcbier | |
| 4,322,163 A | 3/1982 | Schiller | |
| 4,414,684 A | 11/1983 | Blonder | |
| 4,537,484 A | 8/1985 | Fowler et al. | |
| 4,544,267 A | 10/1985 | Schiller | |
| 4,553,837 A | 11/1985 | Marcus | |
| 4,601,195 A | 7/1986 | Garritano | |
| 4,669,487 A | 6/1987 | Frieling | |
| 4,681,435 A | 7/1987 | Kubota et al. | |
| 4,684,802 A | 8/1987 | Hakenewerth et al. | |
| 4,701,772 A | 10/1987 | Anderson et al. | |
| 4,783,823 A | 11/1988 | Tasaki et al. | |
| 4,784,484 A | 11/1988 | Jensen | |
| 4,792,226 A | 12/1988 | Fishbine et al. | |
| 4,811,414 A | 3/1989 | Fishbine et al. | |
| 4,876,726 A | 10/1989 | Capello et al. | |
| 4,905,293 A | 2/1990 | Asai et al. | |
| 4,924,085 A | 5/1990 | Kato et al. | |
| 4,933,976 A * | 6/1990 | Fishbine et al. | 382/127 |
| 4,942,482 A | 7/1990 | Kakinuma et al. | |
| 4,946,276 A | 8/1990 | Chilcott | |
| 4,995,086 A | 2/1991 | Lilley et al. | |
| 5,054,090 A | 10/1991 | Knight et al. | |
| 5,067,162 A | 11/1991 | Driscoll, Jr. et al. | |
| 5,067,749 A | 11/1991 | Land | |
| 5,131,038 A | 7/1992 | Puhl et al. | |
| 5,146,102 A | 9/1992 | Higuchi et al. | |
| 5,157,497 A | 10/1992 | Topper et al. | |
| 5,185,673 A | 2/1993 | Sobol | |
| 5,187,747 A | 2/1993 | Capello et al. | |
| 5,210,588 A | 5/1993 | Lee | |
| 5,222,152 A | 6/1993 | Fishbine et al. | |
| 5,222,153 A | 6/1993 | Beiswenger | |
| 5,230,025 A | 7/1993 | Fishbine et al. | |
| 5,233,404 A | 8/1993 | Lougheed et al. | |
| 5,249,370 A | 10/1993 | Stanger et al. | |
| 5,253,085 A | 10/1993 | Maruo et al. | |
| 5,261,266 A | 11/1993 | Lorenz et al. | |
| 5,285,293 A | 2/1994 | Webb et al. | |
| 5,291,318 A | 3/1994 | Genovese | |
| D348,445 S | 7/1994 | Fishbine et al. | |
| 5,351,127 A | 9/1994 | King et al. | |
| D351,144 S | 10/1994 | Fishbine et al. | |
| 5,363,318 A | 11/1994 | McCauley | |
| 5,384,621 A | 1/1995 | Hatch et al. | |
| 5,412,463 A | 5/1995 | Sibbald et al. | |
| 5,416,573 A | 5/1995 | Sartor, Jr. | |
| 5,448,649 A | 9/1995 | Chen et al. | |
| 5,467,403 A | 11/1995 | Fishbine et al. | |
| 5,469,506 A | 11/1995 | Berson et al. | |
| 5,471,240 A | 11/1995 | Prager et al. | |
| 5,473,144 A | 12/1995 | Mathurin, Jr. | |
| 5,483,601 A | 1/1996 | Faulkner | |
| 5,509,083 A | 4/1996 | Abtahi et al. | |
| 5,517,528 A | 5/1996 | Johnson | |
| 5,528,355 A | 6/1996 | Maase et al. | |
| 5,548,394 A | 8/1996 | Giles et al. | |
| 5,591,949 A | 1/1997 | Bernstein | |
| 5,596,454 A | 1/1997 | Hebert | |
| 5,598,474 A | 1/1997 | Johnson | |
| 5,604,537 A * | 2/1997 | Yamazaki et al. | 348/350 |
| 5,613,014 A | 3/1997 | Eshera et al. | |
| 5,615,277 A | 3/1997 | Hoffman | |
| 5,625,448 A | 4/1997 | Ranalli et al. | |
| 5,633,947 A * | 5/1997 | Sibbald | 382/124 |
| 5,640,422 A | 6/1997 | Johnson | |
| 5,649,128 A | 7/1997 | Hartley | |
| 5,650,842 A | 7/1997 | Maase et al. | |
| 5,661,451 A | 8/1997 | Pollag | |
| 5,680,205 A | 10/1997 | Borza | |
| 5,689,529 A | 11/1997 | Johnson | |
| 5,717,777 A | 2/1998 | Wong et al. | |
| 5,729,334 A | 3/1998 | Van Ruyven | |
| 5,736,734 A | 4/1998 | Marcus et al. | |
| 5,745,684 A | 4/1998 | Oskouy et al. | |
| 5,748,766 A | 5/1998 | Maase et al. | |
| 5,748,768 A | 5/1998 | Sivers et al. | |
| 5,755,748 A | 5/1998 | Borza | |
| 5,757,278 A | 5/1998 | Itsumi | |
| 5,767,989 A | 6/1998 | Sakaguchi | |
| 5,778,089 A | 7/1998 | Borza | |
| 5,781,647 A | 7/1998 | Fishbine et al. | |
| 5,793,218 A | 8/1998 | Oster et al. | |
| 5,801,681 A | 9/1998 | Sayag | |
| 5,805,777 A | 9/1998 | Kuchta | |
| 5,809,172 A | 9/1998 | Melen | |
| 5,812,067 A | 9/1998 | Bergholz et al. | |
| 5,815,252 A | 9/1998 | Price-Francis | |
| 5,818,956 A | 10/1998 | Tuli | |
| 5,822,445 A | 10/1998 | Wong | |
| 5,825,005 A | 10/1998 | Behnke | |
| 5,825,474 A | 10/1998 | Maase | |
| 5,828,773 A | 10/1998 | Setlak et al. | |
| 5,832,244 A | 11/1998 | Jolley et al. | |
| 5,848,231 A | 12/1998 | Teitelbaum et al. | |
| 5,855,433 A | 1/1999 | Velho et al. | |
| 5,859,420 A | 1/1999 | Borza | |
| 5,859,710 A | 1/1999 | Hannah | |
| 5,862,247 A | 1/1999 | Fisun et al. | |
| 5,867,802 A | 2/1999 | Borza | |
| 5,869,822 A | 2/1999 | Meadows, II et al. | |
| 5,872,834 A | 2/1999 | Teitelbaum | |
| 5,892,599 A | 4/1999 | Bahuguna | |
| 5,900,993 A | 5/1999 | Betensky | |
| 5,907,627 A | 5/1999 | Borza | |
| 5,920,384 A | 7/1999 | Borza | |
| 5,920,640 A | 7/1999 | Salatino et al. | |
| 5,928,347 A | 7/1999 | Jones | |
| 5,942,761 A | 8/1999 | Tuli | |
| 5,946,135 A | 8/1999 | Auerswald et al. | |
| 5,960,100 A | 9/1999 | Hargrove | |
| 5,973,731 A | 10/1999 | Schwab | |
| 5,974,162 A | 10/1999 | Metz et al. | |
| 5,987,155 A | 11/1999 | Dunn et al. | |
| 5,991,467 A | 11/1999 | Kamiko | |
| 5,995,014 A | 11/1999 | DiMaria | |
| 5,999,307 A | 12/1999 | Whitehead et al. | |
| 6,005,963 A * | 12/1999 | Bolle et al. | 382/124 |
| 6,018,739 A | 1/2000 | McCoy et al. | |
| 6,023,522 A | 2/2000 | Draganoff et al. | |
| 6,038,332 A | 3/2000 | Fishbine et al. | |
| 6,041,372 A | 3/2000 | Hart et al. | |
| 6,055,071 A | 4/2000 | Kuwata et al. | |
| 6,064,398 A | 5/2000 | Ellenby et al. | |
| 6,064,753 A | 5/2000 | Bolle et al. | |
| 6,064,779 A | 5/2000 | Neukermans et al. | |
| 6,072,891 A | 6/2000 | Hamid et al. | |
| 6,075,876 A | 6/2000 | Draganoff | |
| 6,078,265 A | 6/2000 | Bonder et al. | |
| 6,088,585 A | 7/2000 | Schmitt et al. | |
| 6,097,873 A | 8/2000 | Filas et al. | |
| 6,104,809 A | 8/2000 | Berson et al. | |
| 6,115,484 A | 9/2000 | Bowker et al. | |
| 6,122,394 A | 9/2000 | Neukermans et al. | |
| 6,144,408 A | 11/2000 | MacLean | |
| 6,150,665 A | 11/2000 | Suga | |
| 6,151,073 A * | 11/2000 | Steinberg et al. | 348/371 |
| 6,154,285 A | 11/2000 | Teng et al. | |
| 6,162,486 A | 12/2000 | Samouilhan et al. | |
| 6,166,787 A | 12/2000 | Akins et al. | |

| | | | |
|---|---|---|---|
| 6,178,255 B1 | 1/2001 | Scott et al. |
| 6,195,447 B1 | 2/2001 | Ross |
| 6,198,836 B1 | 3/2001 | Hauke |
| 6,204,331 B1 | 3/2001 | Sullivans et al. |
| 6,259,108 B1 | 7/2001 | Antonelli et al. |
| 6,272,562 B1 | 8/2001 | Scott et al. |
| 6,281,931 B1 | 8/2001 | Tsao et al. |
| 6,327,047 B1 | 12/2001 | Motamed |
| 6,347,163 B1 | 2/2002 | Roustaei |
| 2002/0030668 A1 | 3/2002 | Hoshino et al. |

FOREIGN PATENT DOCUMENTS

| | | |
|---|---|---|
| EP | 0 308 162 A2 | 3/1989 |
| EP | 0 308 162 A3 | 3/1989 |
| EP | 0 379 333 A1 | 7/1990 |
| EP | 0 623 890 A2 | 11/1994 |
| EP | 0 623 890 A3 | 11/1994 |
| EP | 0 653 882 A1 | 5/1995 |
| EP | 0 379 333 B1 | 7/1995 |
| EP | 0 889 432 A2 | 1/1999 |
| EP | 0 889 432 A3 | 1/1999 |
| EP | 0 905 646 A1 | 3/1999 |
| EP | 0 785 750 B1 | 6/1999 |
| EP | 0 924 656 A2 | 6/1999 |
| EP | 0 623 890 B1 | 8/2001 |
| GB | 2 089 545 A | 6/1982 |
| GB | 2 313 441 A | 11/1997 |
| JP | 62-212892 A | 9/1987 |
| JP | 1-205392 A | 8/1989 |
| JP | 3-161884 A | 7/1991 |
| JP | 3-194674 A | 8/1991 |
| JP | 3-194675 A | 8/1991 |
| JP | 11-225272 A | 8/1999 |
| JP | 11-289421 A | 10/1999 |
| WO | WO 87/02491 A1 | 4/1987 |
| WO | WO 90/03260 A1 | 4/1990 |
| WO | WO 92/11608 A1 | 7/1992 |
| WO | WO 94/22371 A2 | 10/1994 |
| WO | WO 94/22371 A3 | 10/1994 |
| WO | WO 96/17480 A2 | 6/1996 |
| WO | WO 96/17480 A3 | 6/1996 |
| WO | WO 97/29477 A1 | 8/1997 |
| WO | WO 97/41528 A1 | 11/1997 |
| WO | WO 98/09246 A1 | 3/1998 |
| WO | WO 98/12670 A1 | 3/1998 |
| WO | WO 99/12123 A1 | 3/1999 |
| WO | WO 99/26187 A1 | 5/1999 |
| WO | WO 99/40535 A1 | 8/1999 |

OTHER PUBLICATIONS

Drake, M.D. et al., "Waveguide hologram fingerprint entry device," *Optical Engineering*, vol. 35, No. 9, Sep. 1996, pp. 2499-2505.
Roethenbaugh, G. (ed.), *Biometrics Explained*, 1998, ICSA, pp. 1-34.
*Automated Identification Systems* (visited May 20, 1999) <http://www.trw.com/idsystems/bldgaccess2.html>, 1 page, Copyright 1999.
*Ultra-Scan Corporation Home Page* (visited May 20, 1999) <http://www.ultra-scan.com/index.htm>, 3 pages. (discusses technology as early as 1996).
*Profile* (last updated Aug. 16, 1998) <http://www.dermalog.de/Britain/Profile/profile.htm>, 3 pages. (discusses technology as early as 1990).
*ID-Card System Technical Specifications* (last updated Jul. 18, 1998) <http://dermalog.de/Britain/Products/ID-Card/idcard2.htm>, 2 pages.
*Fujitsu Limited Products and Services* (updated Apr. 21, 1999) <http://www.fujitsu.co.jp/hypertext/Products/index-e.html>, 3 pages, Copyright 1995-1999.
*SonyDCam* (visited May 20, 1999) <http://www.microsoft.com/DDK/ddkdocs/Win2k/sonydcam.htm>, 3 pages, Copyright 1999.
*Verid Fingerprint Verification* (visited May 17, 1999) <http://www.tssi.co.uk/products/finger.html>, 2 pages.
*Startek's Fingerprint Verification Products: Fingerguard FG-40* (visited May 18, 1999) <http://www.startek.com.tw/product/fg40/fg40.html>, 3 pages.
*SAC Technologies Showcases Stand-Alone SAC-Remote (TM)* (visited May 18, 1999) <http://www.pathfinder.com/money/latest/press/PW/1998Mar25/1026.html>, 2 pages.
"Biometrics, The Future is Now," www.securitymagazine.com, May 1999, pp. 25-26.
*Mytec Technologies Gateway,* (visited Apr. 27, 1999) <http://www.mytec.com/Products/gateway/>, 1 page.
*Mytec Technologies Gateway: Features & Benefits,* (visited Apr. 27, 1999) <http://www.mytec.com/Products/gateway/features.htm>, 1 page.
*Mytec Technologies Touchstone Pro,* (visited Apr. 27, 1999) <http://www.mytec.com/Products/Touchstone/>, 1 page.
*Mytec Technologies Touchstone Pro: Features,* (visited Apr. 27, 1999) <http://www.mytec.com/Products/Touchstone/features.htm>, 1 page.
*Electronic Timeclock Systems and Biometric Readers* (last updated Apr. 17, 1999) <http://www.lfs-hr-bene.com/tclocks.html>, 1 page.
*Fingerprint Time Clock* (visited May 17, 1999) <http://www.lfs-hr-bene.com/Biometrics/Fingerprintclock.html>, 6 pages.
*KC-901: The KSI fingerprint sensor* (visited May 17, 1999) <http://www.kinetic.bc.ca/kc-901.html>, 3 pages.
*INTELNET Inc.* (visited May 20, 1999) <http://www.intelgate.com/index.html>, 1 page, Copyright 1996.
*Ver-i-Fus Fingerprint Access Control System* (visited May 20, 1999) <http://www.intelgate.com/verifus.htm>, 2 pages. (Ver-i-fus product released in 1995).
*Ver-i-fus® Configurations* (visited May 20, 1999) <http://www.intelgate.com/verconfig.htm>, 1 page. (Ver-i-fus product released in 1995).
*Ver-i-Fus® & Ver-i-Fus$^{mil}$®* (visited May 20, 1999) <http://www.intelgate.com/vif_data.htm>, 3 pages. (Ver-i-fus product released in 1995).
*Access Control System Configurations* (visited May 20, 1999) <http://www.intelgate.com/access.htm>, 2 pages. (Ver-i-fus product released in 1995).
*Company* (visited May 17, 1999) <http://www.instainfo.com.company.htm>, 2 pages.
*TouchLock™ II Fingerprint Identity Verification Terminal* (visited May 17, 1999) <http://www.identix.com/TLock.htm>, 4 pages.
*Physical Security and Staff Tracking Solutions* (visited May 17, 1999) <http://www.identix.com/products/biosecurity.html>, 3 pages, Copyright 1996-1998.
*Veriprint2000 Fingerprint Verification Terminal For Use With Jantek Time & Attendance Software* (visited May 17, 1999) <http://www.hunterequipment.com/fingerprint.htm>, 2 pages.
*Veriprint Product Applications* (visited Apr. 27, 1999) <http://www.biometricid.com/uses.htm>, 1 page, Copyright 1999.
*BII Home Page* (visited Apr. 27, 1999) <http://www.biometricid.com/homepage.htm>, 1 page, Copyright 1999.
*Veriprint 2100 Stand-Alone Fingerprint Verification Terminal* (visited Apr. 27, 1999) <http://www.biometricid.com/veriprint2100.htm>, 3 pages.
Randall, N., "A Serial Bus on Speed," *PC Magazine*, May 25, 1999, pp. 201-203.
*The DERMALOG Check-ID* (visited Nov. 12, 1999) <http://www.dermalog.de/ganzneu/products_check.html>, 1 page.
*Check-ID Specifications and Features* (visited Nov. 12, 1999) <http://www.dermalog.de/ganzneu/spec_check.html>, 1 page, Copyright 1999.
*Startek's Fingerprint Verification Products: FingerFile 1050* (visited Oct. 8, 1999) <http://www.startek.com.tw/product/ff1050.html>, 3 pages.
*Time is Money!* (visited Jun. 5, 1998) <http://www.iaus.com/aflm.htm>, 3 pages.
*LS 1 LiveScan Booking Workstation High Performance Finger & Palm Scanning System* (visited Jun. 4, 1998) <http://www.hbs-jena.com/ls1.htm>, 6 pages, Copyright 1998.

*Welcome to the Homepage of Heimann Biometric Systems GMBH* (visited Jun. 4, 1998) <http://www.hbs-jena.com/>, 1 page, Copyright 1998.

*Heimann Biometric Systems Corporate Overview* (visited Jun. 4, 1998) <http://www.hbs-jena.com/company.htm>, 4 pages, Copyright 1998.

*Remote Access Positive IDentification—raPID* (visited Jun. 3, 1998) <http://www.nec.com/cgi-bin/showproduct.exe?pro . . . emote+Access+Positive+IDentification+%2D+raPID>, 2 pages, Copyright 1997.

*Morpho DigiScan Cellular* (visited Jun. 3, 1998) <http://www.morpho.com/products/law_enforcement/digiscan/cellular.htm>, 2 pages, Copyright 1998.

*A.F.I.S.* (last updated Apr. 2, 1998) <http://www.dermalog.de/afis.htm>, 2 pages.

*Morpho FlexScan Workstation* (visited Jun. 3, 1998) <http://www.morpho.com/products/law_enforcement/flexscan/>, 2 pages, Copyright 1998.

True-ID® The LiveScan with special "ability" . . . , 2 pages.

*Printrak International: User List* (visited Jun. 3, 1998) <http://www.printrakinternational.com and links>, 10 pages, Copyright 1996.

*Live-Scan Products: Tenprinter® 1133S* (visited Apr. 23, 1999) <http://www.digitalbiometrics.com/Products/tenprinter.htm>, 4 pages. (Tenprinter 1133S released in 1996).

*TouchPrint™ 600 Live-Scan System* (visited Nov. 17, 1999) <http://www.identix.com/products/livescan.htm>, 4 pages, Copyright 1996-1998.

Systems for Live-Scan Fingerprinting, Digital Biometrics, Inc., 8 pages, Copyright 1998.

DBI FingerPrinter CMS, Digital Biometrics, Inc., 5 pages. (CMS released in 1998).

Fingerscan V20, Identix Incorporated, 1 page, Copyright 1999.

Verid Fingerprint Reader, TSSI, 4 pages.

Response to Request for Information, Cross Match Technologies, Inc., 13 pages, Apr. 14, 1999.

*Startek's Fingerprint Verification Products* (visited Nov. 17, 1999) <http://www.startek.com.tw/product/index.html>, 1 page.

*Introduction to Startek's Fingerprint Verification Products* (visited Nov. 17, 1999) <http://www.startek.com.tw/product/index2.html>, 2 pages.

*Automatic Fingerprint Identification Systems* (visited Nov. 17, 1999) <http://www.sagem.com/en/produit4-en/empreinte-dig-en.htm>, 1 page.

*Digital Biometrics Corporate Information* (visited Nov. 17, 1999) <http://www.digitalbiometrics.com/Corporate_info/Corporate_info.htm>, 2 pages. (discusses technology as early as 1985).

*DBI Live-Scan Products: Digital Biometrics TENPRINTER* (visited Nov. 17, 1999) <http://www.digitalbiometrics.com/products/tenprinter.htm>, 4 pages. (Tenprinter released in 1996).

*DBI Live-Scan Products: Networking Options* (visited Nov. 17, 1999) <http://www.digitalbiometrics.com/products/networking_options.htm>, 3 pages.

*DBI Live-Scan Products: Digital Biometrics FingerPrinter CMS* (visited Nov. 17, 1999) <http://www.digitalbiometrics.com/products/FingerPrinterCMS.htm>, 3 pages. (CMS released in 1998).

*DBI Live-Scan Products: Image Printer Stations* (visited Nov. 17, 1999) <http://www.digitalbiometrics.com/products/imageprinter.htm>, 2 pages.

*DBI Live-Scan Products: FC-21 Fingerprint Capture Station* (visited Nov. 17, 1999) <http://www.digitalbiometrics.com/products/Fingerprintcapture.htm>, 2 pages.

*Series 400 OEM Scanner* (visited Nov. 17, 1999) <http://www.ultra-scan.com/400.htm>, 3 pages. (Scanner released in 1996).

*USC Scanner Design* (visited Nov. 17, 1999) <http://www.ultra-scan.com/scanner.htm>, 4 pages. (Scanner released in 1996).

*Series 500/600 Scanners* (visited Nov. 17, 1999) <http://www.ultra-scan.com/500.htm>, 3 pages. (Scanner released in 1996).

*Series 700 ID Station* (visited Nov. 17, 1999) <http://www.ultra-scan.com/700.htm>, 3 pages. (Scanner released in 1998).

*Identix: The Corporation* (visited Nov. 17, 1999) <http://www.identix.com/corporate/home.htm>, 2 pages, Copyright 1996-1998.

*Biometric Imaging Products* (visited Nov. 17, 1999) <http://www.identix.com/products/bioimage.htm>, 1 page, Copyright 1996-1998.

*TouchPrint™ 600 Live-Scan System* (visited Apr. 23, 1999) <http://www.identix.com/products/livescan.htm>, 4 pages, Copyright 1996-1998.

*TouchPrint™ 600 Palm Scanner* (visited Nov. 17, 1999) <http://www.identix.com/products/palmscan.htm>, 3 pages, Copyright 1996-1998.

*TouchPrint™ 600 Card Scan System* (visited Nov. 17, 1999) <http://www.identix.com/products/cardscan.htm>, 3 pages, Copyright 1996-1998.

*Dermalog Key—The safest and easiest way of access control* (Last updated Jul. 18, 1998) <http://www.dermalog.de/Britain/Products/Key/key.htm>, 1 page.

*Dermalog Finger-ID Your small size solution for high security* (Last updated Jul. 18, 1998) <http://www.dermalog.de/Britain/Products/Finger/fingerid.htm>, 1 page.

*Mytec: Corporate* (visited Nov. 17, 1999) <http://www.mytec.com/corporate/>, 2 pages.

*Kinetic Sciences Inc. Fingerprint Biometrics Division* (visited Nov. 17, 1999) <http://www.kinetic.bc.ca/main-FPB.html>, 1 page.

*Fingerprint Biometrics: Securing The Next Generation*, May 19, 1999, (visited Nov. 17, 1999) <http://www.secugen.com/pressrel.htm>, 2 pages.

*Secugen Unveils Fully Functional Fingerprint Recognition Solutions*, May 11, 1999, (visited Nov. 17, 1999) <http://www.secugen.com/pressrel.htm>, 3 pages.

*POLLEX Technology Ltd., The Expert in Fingerprint Identification—POLLog* (visited Nov. 17, 1999) <http://www.pollex.ch/english/products/pollog.htm>, 2 pages.

*Sony Fingerprint Identification Terminal* (visited Nov. 17, 1999) <http://www.iosoftware.com/biosols/sony/fiu/applications/fit100.htm>, 2 pages.

*Sony Fingerprint Identification Unit (FIU-700)* (visited Nov. 17, 1999) <http://www.iosoftware.com/biosols/sony/fiu70/index.htm>, 2 pages. (Unit available late 1999).

*Sony Fingerprint Identification Unit* (visited Nov. 17, 1999) <http://www.iosoftware.com/biosols/sony/fiu/index.htm>, 3 pages.

*Fujitsu Fingerprint Recognition Device (FPI-550)* (visited Nov. 17, 1999) <http://www.iosoftware.com/biosols/fujitsu/fpi550.htm>, 2 pages.

*Mitsubishi MyPass LP-1002* (visited Nov. 17, 1999) <http://www.iosoftware.com/biosols/mitsubishi/mypass.htm>, 2 pages.

*SecureTouch PV—A Personal "Password Vault"* (visited Nov. 17, 1999) <http://www.biometricaccess.com/securetouch_pv.htm>, 1 page.

*Digital Descriptor Systems, Inc.-Profile* (visited Nov. 17, 1999) <http://www.ddsi-cpc.com/pages/profile.html>, 3 pages.

*Press Release: Printrak International Announces New Portable Fingerprint ID Solution*, Dec. 10, 1996, (visited Nov. 17, 1999) <http://www.scott.net/~dg/25.htm>, 3 pages.

*Corporate Profile* (visited Nov. 17, 1999) <http://www.printrakinternational.com/corporate.htm>, 1 page.

*Printrak Products* (visited Nov. 17, 1999) <http://www.printrakinternational.com/Products.htm>, 1 page. (Discusses technology as early as 1974).

Verifier™ 200 Fingerprint Capture Devices, Cross Match Technologies, Inc., 2 pages, 1996-1997.

Verifier 200 Direct Fingerprint Reader, Cross Check Corporation, 2 pages, 1996-1997.

Verifier™ 250 Fingerprint Capture Devices, Cross Match Technologies, Inc., 2 pages, 1996-1997.

Verifier 250 Small Footprint Direct Fingerprint Reader, Cross Check Corporation, 2 pages, 1996-1997.

Verifier™ 290 Fingerprint Capture Devices, Cross Match Technologies, Inc., 2 pages, 1996-1997.

Verifier 290 Direct Rolled Fingerprint Reader, Cross Check Corporation, 2 pages, 1996-1997.

Verifier™ 500 Fingerprint Capture Devices, Cross Match Technologies, Inc., 2 pages, 1998.

Biometric terminal, 1 page.

10-Print Imaging System, Cross Check Corporation, 2 pages, 1998.

*Cross Match Technologies, Inc.* (visited Mar. 25, 1999) <http://www.crossmatch.net/>, 1 page.
*Cross Match Technologies, Inc.—Products Overview* (visited Mar. 25, 1999) <http://www.crossmatch.net/new/products/product-index.html>, 1 page.
*Cross Match Technologies, Inc.—Law Enforcement Systems* (visited Mar. 25, 1999) <http://www.crossmatch.net/new/law/law-index.html>, 2 pages.
*Cross Match Technologies, Inc.—Commercial Systems: Building On The Standard* (visited Mar. 25, 1999) <http://www.crossmatch.net/new/commercial/commercial-index.html>, 2 pages.
*Cross Match Technologies, Inc.—International Sales* (visited Mar. 25, 1999) <http://www.crossmatch.net/new/sales/sales-index.html>, 1 page.
*Cross Match Technologies, Inc.—Support* (visited Mar. 25, 1999) <http://www.crossmatch.net/new/support/support-index.html>, 1 page.
*Cross Match Technologies, Inc.—News-Press Releases—Verifier 400 Press Release* (visited Mar. 25, 1999) <http://www.crossmatch.net/new/news-pr-050798.html>, 1 page.
*Global Security Fingerscan™ System Overview* (visited Jan. 11, 2000) <http://wwwu-net.com/mbp/sol/g/a9.htm>, 12 pages.
"Command Structure for a Low-Cost (Primitive) Film Scanner," *IBM Technical Disclosure Bulletin*, IBM Corp., vol. 35, No. 7, Dec. 1992, pp. 113-121.
*Fingerprint Scan API Toolkit Version 1.x Feature List* (Apr. 26, 2000) <http://www.mentalix.com/api/archive_fapivl.htm>, 3 pages.
"Image Acquisition System," *IBM Technical Disclosure Bulletin*, IBM Corp., vol. 29, No. 5, Oct. 1986, pp. 1928-1931.
Kunzman, Adam J. and Wetzel, Alan T., "1394 High Performance Serial Bus: The Digital Interface for ATV," *IEEE Transaction on Consumer Electronics*, IEEE, vol. 41, No. 3, Aug. 1995, pp. 893-900.
*Mentalix Provides The First IAFIS-Certified Latent Print Scanning Solution For Windows® (Jul. 23, 1999)* <http://www.mentalix.com/pressreleases/fprintlook3_prel.htm>, 2 pages.
Slujis, F. et al., "An On-chip USB-powered Three-Phase Up/down DC/DC Converter in a Standard 3.3V CMOS Process," *2000 IEEE International Solid-State Circuits Conference*, IEEE, Feb. 9, 2000, pp. 440-441.
Venot, A. et al., "Automated Comparison of Scintigraphic Images," *Journal of Nuclear Medicine*, vol. 27, No. 8, Aug. 1986, pp. 1337-1342.

English-language Abstract for Japanese Patent Publication No. 59-103474, published Jun. 14, 1984, printed from espacenet.com, 1 page.
English-language Abstract for Japanese Patent Publication No. 62-212892, published Sep. 18, 1987, printed from espacenet.com, 1 page.
English-language Abstract for Japanese Patent Publication No. 1-205392, published Aug. 17, 1989, printed from espacenet.com, 1 page.
English-language Abstract for Japanese Patent Publication No. 3-161884, published Jul. 11, 1991, printed from espacenet.com, 1 page.
English-language Abstract for Japanese Patent Publication No. 3-194674, published Aug. 26, 1991, printed from espacenet.com, 1 page.
English-language Abstract for Japanese Patent Publication No. 3-194675, published Aug. 26, 1991, printed from espacenet.com, 1 page.
English-language Abstract for Japanese Patent Publication No. 10-079017, published Mar. 24, 1998, printed from espacenet.com, 1 page.
English-language Abstract for Japanese Patent Publication No. 10-262071, published Sep. 29, 1998, printed from espacenet.com, 1 page.
English-language Abstract for Japanese Patent Publication No. 11-167630, published Jun. 22, 1999, printed from espacenet.com, 1 page.
English-language Abstract for Japanese Patent Publication No. 11-225272, published Aug. 17, 1999, printed from espacenet.com, 1 page.
English-language Abstract for Japanese Patent Publication No. 11-252489, published Sep. 17, 1999, printed from espacenet.com, 1 page.
English-language Abstract for Japanese Patent Publication No. 11-289421, published Oct. 19, 1999, printed from espacenet.com, 1 page.
International Search Report and Written Opinion, 12 pages, for PCT Appl. No. PCT/US04/05709, mailed Aug. 16, 2005.

* cited by examiner

DYNAMIC IMAGE ADAPTATION METHOD FOR ADJUSTING THE QUALITY OF DIGITAL PRINTS

BACKGROUND OF THE INVENTION

1. Field of the Invention

The present invention is generally related to biometric imaging systems. More particularly, the present invention is related to a live scan optical system.

2. Background Art

Biometrics are a group of technologies that provide a high level of security. Print capture and recognition is an important biometric technology. Law enforcement, banking, voting, commerce, retail, and other industries increasingly rely upon fingerprints as a biometric to recognize or verify identity. See, *Biometrics Explained*, v. 2.0, G. Roethenbaugh, International Computer Society Assn. Carlisle, Pa. 1998, pages 1–34 (incorporated herein by reference in its entirety). Generally, a biometric is a measurable, physical characteristic or personal behavior trait used to recognize the identity, or verify the claimed identity, of a person who has a biometric reference template (e.g., data that represents a biometric measurement) on file.

Live scanners are used to capture measurable characteristics of a human being, such as fingerprints, palm prints, footprints, etc. Such live scanners include CCD or CMOS cameras and illumination sources for capturing the biometric image. Configurations of the illumination source and camera for a live scanner are typically set by the manufacturer at the factory. Thus, the ability to adaptively adjust gain, integration time, and contrast for the camera, as well as control the illumination for the illumination source does not exist.

To obtain a high quality biometric image, what is therefore needed is a live scan system that adaptively controls the camera and the illumination.

BRIEF SUMMARY OF THE INVENTION

Embodiments of the present invention provide a method for adaptive control of a system used to produce a print image. The method includes detecting an image, identifying a print image region in the image, generating a measured histogram of the print image region, and determining an energy value of the measured histogram. The method also includes generating a desired histogram based on the measured histogram and determining an energy value of the desired histogram. The method further includes determining an adaptive control energy based on the energy of the measured histogram and the energy of the desired histogram and using the adaptive control energy to generate a set of control parameter values to adaptively control the optical scanner system, such that a predetermined quality of the print image is produced.

Other embodiments of the present invention provide a system using adaptive control to produce a print image of a predetermined quality. The system includes an illumination source, a live scanner optical system, a camera, and a controller. The illumination source illuminates an imaging surface of a live scanner optical system. The live scanner optical system scans a biometric object placed on the imaging surface. The camera captures the print image of a biometric object placed on the imaging surface. The controller adaptively controls at least one of the illumination source or the camera to obtain the print image with the predetermined quality.

An aspect of the present invention provides the adaptive control based on adjustments of parameter values. The adjustment can be based on a difference in energy of pixel counts across grey scale values between a desired histogram and a measured histogram.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art(s) to make and use the invention.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

Overview

Adaptive control of a live scanner according to the present invention can allow the live scanner to capture high quality print images in a variety of environmental conditions. Adaptive controlling of the camera and the illumination source can be performed by adjusting one or more of contrast, gain, and integration time for the camera, and illumination for the illumination source. Such adaptive control can increase a design tolerance for the live scanner. In that way, high quality print images can be obtained over a relatively greater range of illumination sources, cameras, and operating conditions.

While the present invention is described herein with reference to illustrative embodiments for particular applications, it should be understood that the invention is not limited thereto. Those skilled in the art(s) with access to the teachings provided herein will recognize additional modifications, applications, and embodiments within the scope thereof and additional fields in which the present invention would be of significant utility.

TERMINOLOGY

To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "print" can be any type of print including, but not limited to, a print of all or part of one or more fingers, palms, toes, foot, hand, etc. A print can also be a rolled print, a flat print, or a slap print.

The term "data" or "information" throughout the specification can be representative of a biometric, a digital or other image of a biometric (e.g., a bitmap or other file), extracted digital or other information relating to the biometric, etc.

The term "live scan" refers to a scan of any type of print or palm image made by a print scanner. A live scan can include, but is not limited to, a scan of a finger, a finger roll, a flat finger, slap print of four fingers, thumb print, palm print, hand print, or a combination of fingers, such as, sets of fingers and/or thumbs from one or more hands or one or more palms disposed on a platen.

In a live scan, one or more fingers or palms from either a left hand or a right hand or both hands are placed on a platen of a scanner. Different types of print images are detected depending upon a particular application. For example, a flat print consists of a fingerprint image of a digit (finger or thumb) pressed flat against the platen. A roll print consists of an image of a digit (finger or thumb) made while the digit (finger or thumb) is rolled from one side of the digit to another side of the digit over the surface of the platen. A slap print consists of an image of four flat fingers pressed flat against the platen. A palm print involves pressing all or part of a palm upon the platen. A hand print consists of all or part of one or more hands placed on a platen. A platen can be movable or stationary depending upon the particular type of scanner and the type of print being captured by the scanner.

The terms "biometric imaging system," "scanner," "live scanner," "live print scanner," "fingerprint scanner," and "print scanner" are used interchangeably, and refer to any type of scanner which can obtain an image of a print in a live scan. The obtained images can be combined in any format including, but not limited to, an FBI, state, or international tenprint format.

The term "platen" refers to a component that includes an imaging surface upon which at least one biometric object having a print is placed during a live scan. A platen can include, but is not limited to, a surface of an optical prism, set of prisms, or set of micro-prisms, or a surface of a silicone layer or other element disposed in optical contact with a surface of an optical prism, set of prisms, or set of micro-prisms.

System Overview

Embodiments of the present invention provide a system and method for adaptively controlling a live scanner. The system and method may be used in any type of live scanner, including but not limited to, any type of fingerprint and/or palm print scanner.

Figure 1:
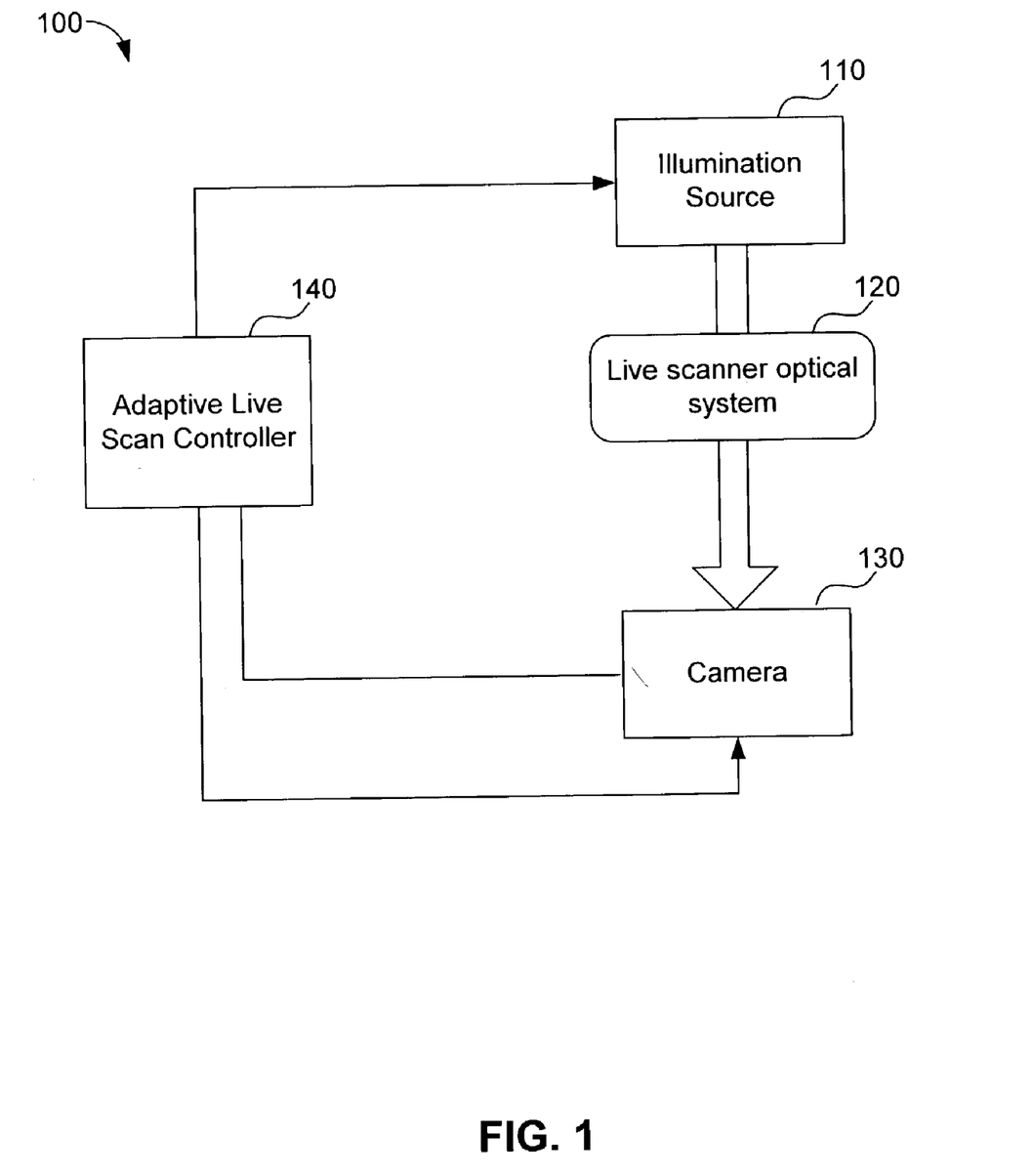
FIG. 1 is a diagram illustrating an optical scanner system according to an embodiment of the present invention.

FIG. 1 is a block diagram illustrating a system (e.g., a live scanner system) 100 according to an embodiment of the present invention. System 100 includes an illumination source 110, an optical system (e.g., an optical system in a live scanner system) 120, an illumination sensor (e.g., a camera) 130, and a controller (e.g., an adaptive live scan controller) 140. Illumination system 110 projects light through live scanner optical system 120 to be detected by camera 130. Adaptive live scan controller 140 is coupled to illumination source 110 and camera 130. During operation, illumination source 110 illuminates the underside of a platen in live scanner optical system 120. The platen is an imaging surface upon which a biometric object is placed for imaging. Although the term "platen" is used throughout the specification, it is to be appreciated any optical element, or surface thereof, can be used for imaging a biometric object.

Camera 130 can be a solid state digital camera, such as a charged coupled device (CCD) or complimentary MOSFET (CMOS) camera, or the like. Live scanner optical system 120 can be any optical system in which biometric print images can be captured. An example of live scanner optical system 120 may include, but is not limited to, the optical system in any live scanner manufactured by Cross Match Technologies, Inc. Live scanner optical systems, such as live scanner optical system 120, are well known to those skilled in the relevant art(s).

Adaptive live scan controller 140 is used to adaptively control system 100 to obtain high quality biometric prints. Adaptive live scan controller 140 adaptively controls illumination source 110 and camera 130 by adjusting one or more parameters, such as illumination for illumination source 110 and contrast, gain, and integration time for camera 130. One method used by adaptive live scan controller 140 to adaptively control system 100 is described below with reference to FIGS. 2–5.

Method for Adaptive Control of a Live Scanner System

Figure 2:
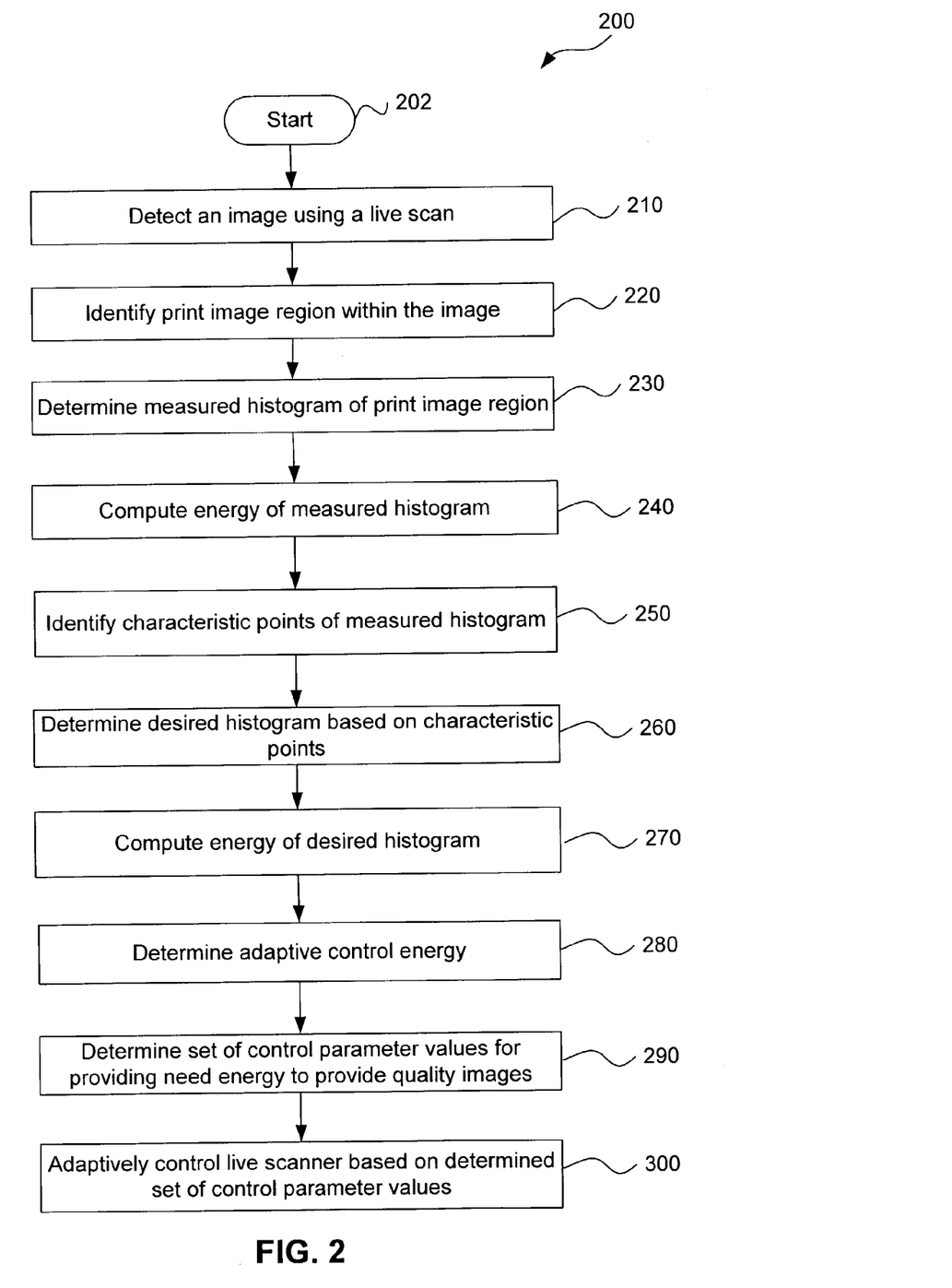
FIG. 2 is a flow diagram describing a method for adaptive control of an optical scanner system according to an embodiment of the present invention.

FIG. 2 is a flow diagram 200 depicting a method for adaptive control of a system according to an embodiment of the present invention (steps 202–300). It is to be appreciated that other methods for adaptive control are contemplated within the scope of the invention. It will be apparent to persons skilled in the relevant art(s) after reading the teachings provided herein that other functional flow diagrams are within the scope of the present invention. Method 200 starts at step 202, and proceeds to step 210.

In step 210, an image is detected during a live scan. As previously stated, a live scan is a scan of any type of print and/or palm print image made by a print scanner.

In step 220, a print image region is identified within the image. The print image region is a region containing pixel data associated with a print image. In one embodiment, groups of pixels are evaluated to determine a standard deviation between the pixels in each of the groups. A group of the pixels with a largest standard deviation is masked as the print image region. In another embodiment, the image is masked and a gray area within the image, usually in the shape of a square or rectangle, is identified as the print image region.

In step 230, a measured histogram of the print image region is determined. The histogram is a plot of pixel counts of gray scale values across a two dimensional region of the print image region identified in step 220.

Figure 3A:
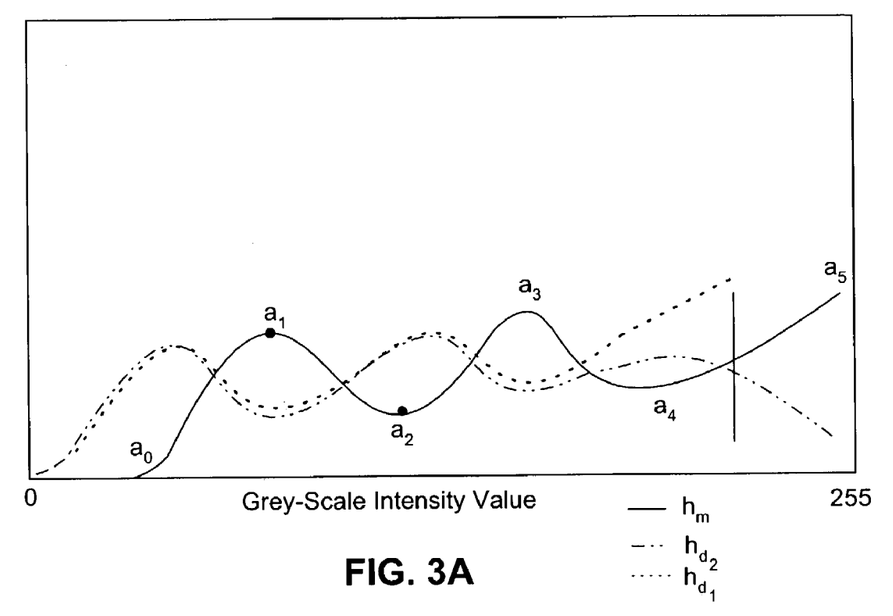
FIGS. 3A and 3B are diagrams illustrating histograms of a print image region according to an embodiment of the present invention.

FIG. 3A shows an exemplary histogram of a print image region determined in step 230, according to an embodiment of the present invention. In FIG. 3A, the print image region identified in step 220 is indicated as $h_m$ for a measured histogram of the identified print image region. The measured histogram can provide information about a quality of the image. It can also provide information about ridges and valleys of the image and information between the ridges and valleys.

Returning to FIG. 2, in step 240, energy of the measured histogram, $h_m$, is determined. In one embodiment, the energy is computed based on an integral function, which increases the weight of each pixel value as the gray scale values increase. Integral functions are well known to those skilled in the relevant art(s). In this way, energy can be a function of the pixels at different grey scale values. For example, if grey scale values range from 0 (e.g., black) to 255 (e.g., white), the integral of the pixel count will attribute a higher energy value to greater numbers of pixels having grey scale values closer to 255 (e.g., white) and lower energy values when a greater number of pixels have grey scale values closer to 0 (e.g., black). Alternatively, depending on the type of illumination, if grey scale values range from 0 (e.g., white) to 255 (e.g., black), the integral of the pixel count will attribute a higher energy value to greater numbers of pixels having grey scale values closer to 255 (e.g., black) and lower energy values when a greater number of pixels have grey scale values closer to 0 (e.g., white).

In step 250, characteristic points of the measured histogram, $h_m$, are identified. Characteristic points may include a starting point, an ending point, and intermediate points. Intermediate points can be maxima and minima points.

Referring back to FIG. 3A, characteristic points for measured histogram $h_m$ are indicated as $a_0$, $a_1$, $a_2$, $a_3$, $a_4$, and $a_5$. Thus, the starting point is indicated as $a_0$ and the ending point is indicated as $a_5$. Maxima points are shown as $a_1$ and $a_3$. Minima points are shown as $a_2$ and $a_4$.

Returning to FIG. 2, in step 260, a desired histogram is determined based on the identified characteristic points. The desired histogram represents a distribution of pixel counts of grey scale values associated with obtaining a high quality print image.

In the example shown in FIG. 3A, a first desired histogram, identified as $h_{d1}$, is generated by shifting the measured histogram over by an amount that enables a starting point to begin at 0,0. A final desired histogram, identified as $h_{d2}$, is generated by shifting the measured histogram over so that the end point of the shifted measured histogram is in a direction that lowers the ending value. This may be done when the ending value of the measured histogram $h_m$ at point $a_5$ is large.

Returning to FIG. 2, in step 270, the energy of the desired histogram is determined. Again, an integral function can be used, giving more weight to each pixel value as the gray scale values increase.

In step 280, an adaptive control energy is determined. The adaptive control energy is based on the difference between the energy of the measured histogram and the energy of the desired histogram. The adaptive control energy can be equal to the difference or a function of the difference in the energies of the measured and the desired histograms. The adaptive control energy is used to determine the adaptive control of camera 130 and illumination source 110.

In step 290, a set of control parameter values that provide the required adaptive control energy is determined. In one embodiment, the set of control parameters can include contrast, gain adjustment, and integration time for camera 130 and illumination for illumination source 110. Determination of the set of control parameter values is further described below with reference to FIG. 4.

In step 300, system 100 is adaptively controlled based on the set of control parameter values determined in step 290.

As will become apparent to persons skilled in the relevant arts given the description herein, an optional memory can be added to system 100 to enhance the functionality of system 100. Such enhancements might include, for example, an ability to more reliably estimate imaging performance. This optional memory can be added between camera 130 and adaptive live scan controller 140.

Figure 3B:
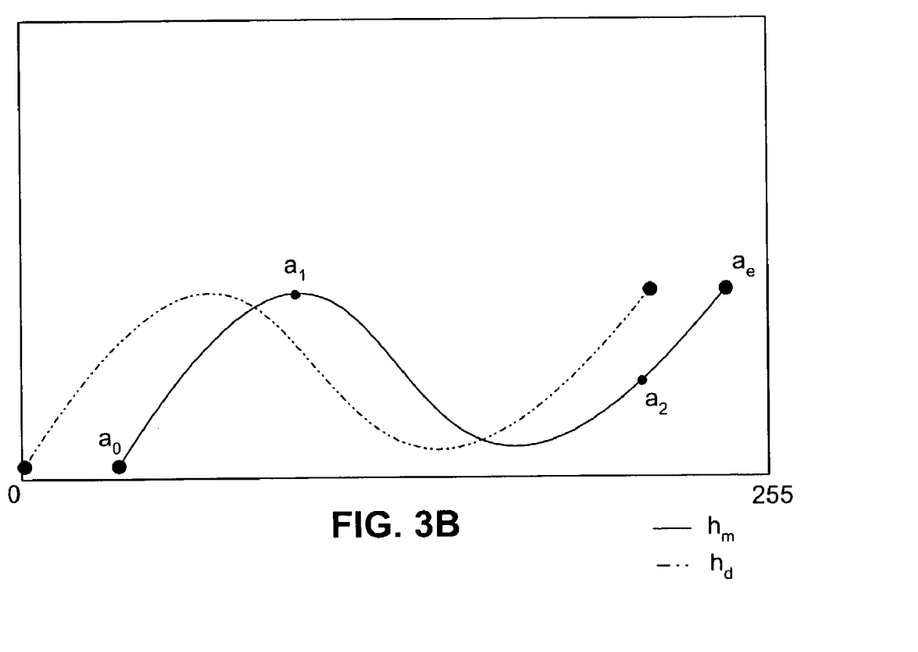

FIG. 3B is a diagram illustrating a set of histograms include a measured histogram, $h_m$, and a desired histogram, $h_d$, that may result from a print image according to an embodiment of the present invention. In FIG. 3B, the desired histogram exhibits a large value at an end value $a_3$. When this occurs, camera 130 may not be adjustable for contrast. Unlike FIG. 3B, the desired histogram of FIG. 3A exhibits a small value at the end value $a_5$. This is an indication that contrast for camera 130 can be adjusted. With regards to both FIGS. 3A and 3B, the desired histogram starting point of $a_0$ indicates that integration time and gain for camera 130 maybe adjusted, as well as, illumination for illumination source 110. Thus, a shift in the starting point of the measured histogram compared to the desired histogram is an indication that gain, integration time, and illumination may be adjusted, and the ability to lower the ending point of the measured histogram is an indication that contrast may be adjusted.

Figure 4:
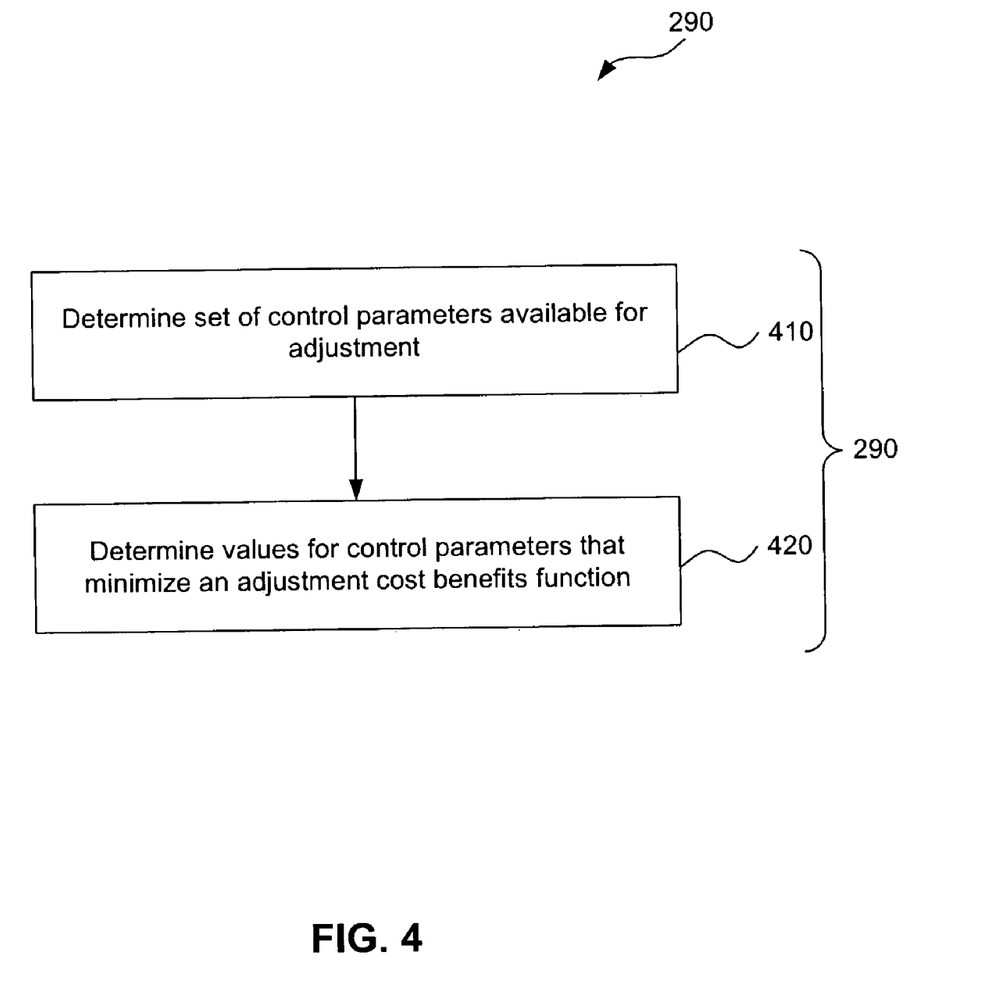
FIG. 4 is a flow diagram describing a method for determining a set of control parameter values for providing an adaptive control setting according to an embodiment of the present invention.

FIG. 4 shows details of step 290, and further describes the method for determining the set of control parameter values for providing the required adaptive control energy according to an embodiment of the present invention. It is to be appreciated that the invention is not limited to the description provided herein with respect to flow diagram 290. Rather, it will be apparent to persons skilled in the relevant art(s) after reading the teachings provided herein that other functional flow diagrams are within the scope of the present invention.

In step 410, a set of control parameters available for adjustment are determined. For example, if the desired histogram is that shown in FIG. 3A, then the set of control parameters available for adjustment include contrast, gain, and integration time for camera 130 and illumination for illumination source 110. Alternatively, if the desired histogram is that shown in FIG. 3B, then the set of control parameters available for adjustment include gain and integration time for camera 130 and illumination for illumination source 110. These examples are illustrative and not intended to limit the present invention. Other combinations of control parameters can be used depending upon a particular application, environment, or level of quality that is acceptable. For example, the control parameters can be any one or more of contrast, gain, integration, time, and illumination, or any combination thereof.

In step 420, values for the control parameters that minimize an adjustment cost/benefit function are determined. Some example "costs" can be that: (1) adjusting contrast may cause a large drop out noise and/or compromise a dynamic range of system; (2) adjusting gain may cause some drop out noise; (3) adjustments in illumination may shorten product life and/or cause large power consumption; and (4) adjustments in integration time may cause drop out noise and/or latency of image capture. Thus, in one embodiment, each of the control parameters is adjusted until a tolerance (e.g., a desired energy value) is met. The desired energy value can be a maximum or minimum value depending on whether the measured energy was too high or low relative to the desired energy. Then, ranges in which to adjust the control parameters must be set by determining, for example, scale factors for each parameter, which vary from system to system. For example, in an embodiment illumination adjustment may range from 5 mA per LED to 30 mA per LED, integration time may range from 9 msec to 30 msec, gain may be multiplied by a factor between 1 and 8.2, and contrast may be multiplied by a factor between 1 and 2. In this way, adaptive control is provided to the illumination source and camera, such that a subsequent measured histogram's pixel counts of grey scale value in a print image region are closer to a desired histogram associated with a high quality print image. A method according to an embodiment of the present invention that is used to determine the desired adjustments is described below with reference to FIG. 5.

Figure 5:
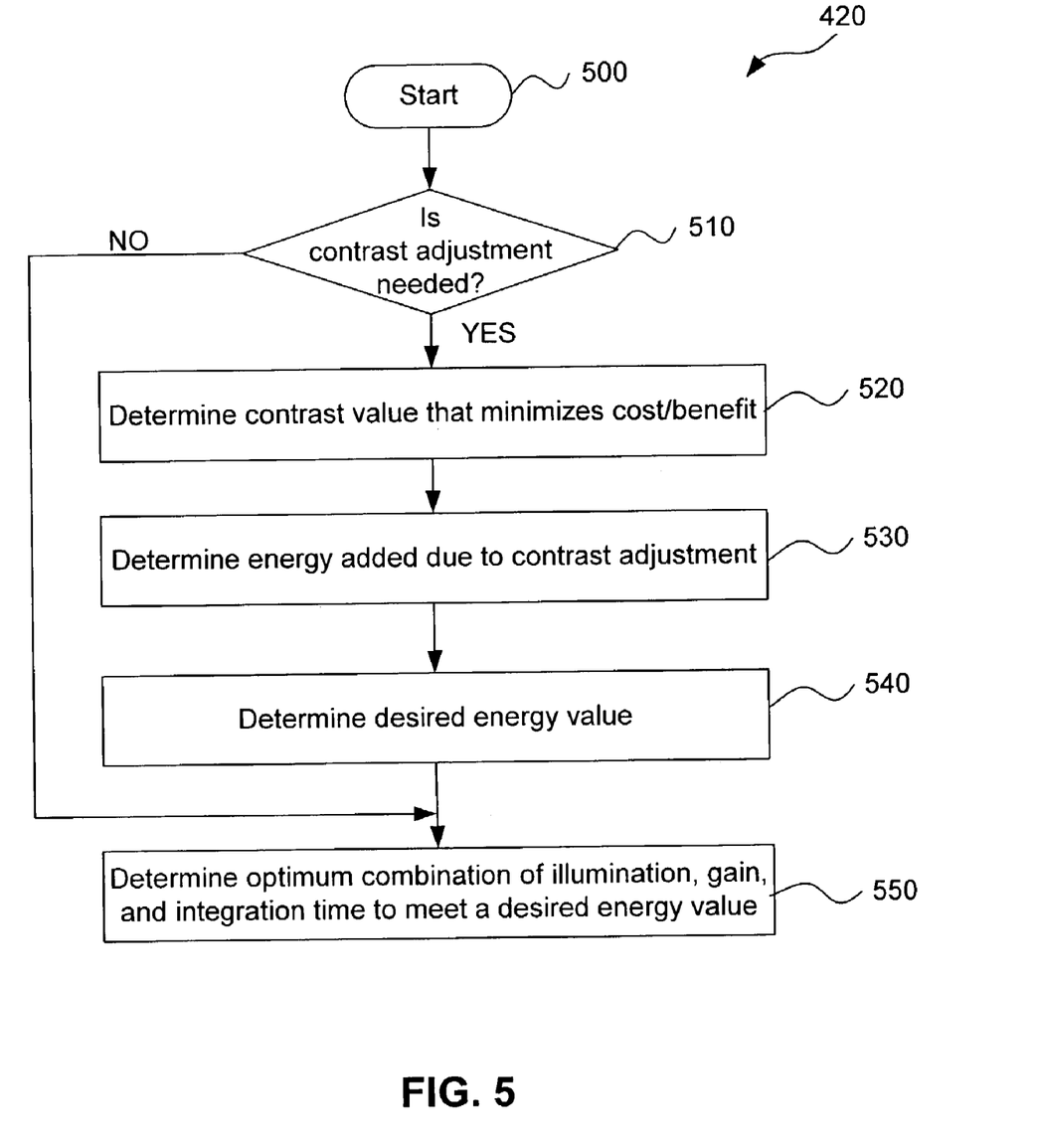
FIG. 5 is a flow diagram describing a method for determining an adaptive control setting for minimizing an adjustment cost function according to an embodiment of the present invention.

FIG. 5 is a flow diagram shows further details of step 420 according to an embodiment of the present invention. It is to be appreciated that the invention is not limited to the description provided herein with respect to flow diagram 420. Rather, it will be apparent to persons skilled in the relevant art(s) after reading the teachings provided herein that other functional flow diagrams are within the scope of the present invention. The process state in step 500 and immediately proceeds to step 510.

In step 510, a determination is made whether an adjustment in contrast is needed or allowed. For example, as previously discussed, if the desired histogram is indicative of FIG. 3A contrast may be adjusted. If contrast adjustment is needed and allowed, the process proceeds to step 520.

In step 520, a contrast value that minimizes an adjustment of contrast is determined.

In step 530, energy generated from the contrast adjustment value determined in step 520 is determined.

In step 540, an amount of energy (either positive or negative) required to meet a desired energy value is determined. As generally discussed above, the amount of energy is determined by subtracting the energy generated from the contrast adjustment value determined in step 520 from the total adaptive control energy determined in step 280 of FIG. 2.

Returning to step 510, if the desired histogram is indicative of FIG. 3B, contrast cannot be adjusted. Thus, if no contrast adjustment is needed the process proceeds to step 550.

In step 550, an optimum combination of illumination value, integration time, and gain value is determined in order to meet the desired energy value. In one embodiment, the order in which the control parameter values are determined is illumination, integration time, and gain. Methods such as gradient search may be used to determine the optimum combination of illumination, integration time, and gain. The order is preferably selected based on achieving a high quality print image. Other orders can be chosen depending upon the choice or preference of a particular designer.

It is to be appreciated that in various embodiments, the process 420 can begin in determination step 510 determining whether an adjustment in contrast, illumination, integration time, or gain is needed or allowed to meet the desired energy value. Then, successive steps would be used to see if one or more of the other parameters can and need to be adjusted to meet the desired energy value. For example, when illumination is the first parameter, if by adjusting the illumination the desired energy value is satisfied, the process ends. If the desired energy value is not satisfied, integration time can be adjusted. If the addition of the adjustment of integration time provides the desired energy value, gain will not be adjusted. But in the alternative, if the addition of the adjustment of integration does not provide the desired energy value, gain can be adjusted to provide the desired energy value. This process may be repeated until the optimum combination of contrast, illumination, integration time, and gain values is achieved in order to satisfy the desired energy value.

Therefore, through use of the above systems and methods, adaptive control of a live scanner can allow the live scanner to capture high quality print images in a variety of environmental conditions. Adaptive controlling of the camera and the illumination source can be performed by adjusting one or more of contrast, gain, and integration time for the camera, and illumination for the illumination source. Such adaptive control can increase a design tolerance for the live scanner. In that way, high quality print images can be obtained over a relatively greater range of illumination sources, cameras, and operating conditions.

Environment

Figure 6:
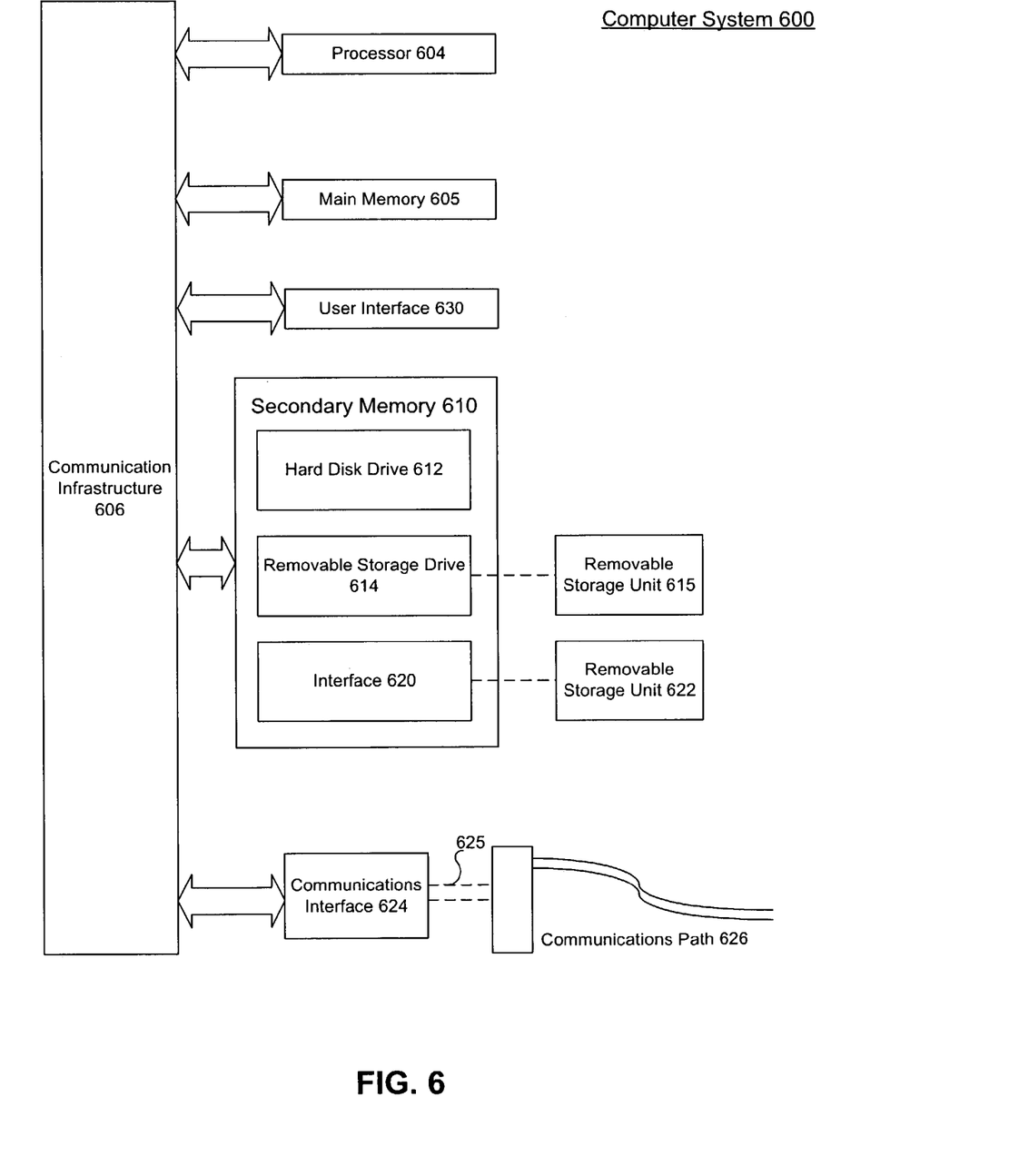
FIG. 6 is an exemplary block diagram illustrating a computer system according to an embodiment of the present invention.

FIG. 6 illustrates one or more processors, such as processor 604. Processor 604 can be a special purpose or a general purpose digital signal processor. The processor 604 is connected to a communications infrastructure 606 (for example, a bus or network). Various software implementations are described in terms of this exemplary computer system. After reading this description, it will become apparent to a person skilled in the relevant art how to implement the invention using other computer systems and/or computer architectures.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCM-CIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link and other communications channels.

In this document, the terms "computer program medium" and "computer usable medium" are used to generally refer to media such as removable storage drive 614, a hard disk installed in hard disk drive 612, and signals 628. These computer program products are means for providing software to computer system 600.

Computer programs (also called computer control logic) are stored in main memory 608 and/or secondary memory 610. Computer programs may also be received via communications interface 624. Such computer programs, when executed, enable the computer system 600 to implement the present invention as discussed herein. In particular, the computer programs, when executed, enable the processor 604 to implement the processes of the present invention, such as the methods in FIGS. 2, 4, and/or 5. Accordingly, such computer programs represent controllers of the computer system 600. By way of example, in the embodiments of the invention, the processes performed by the adaptive line scan controller 140 can be performed by computer control logic. Where the invention is implemented using software, the software may be stored in a computer program product and loaded into computer system 600 using removable storage drive 614, hard drive 612 or communications interface 624.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for adaptive control of a system used to produce a biometric print image, comprising:
   detecting an image;
   identifying a biometric print image region in the image;
   generating a measured histogram of the biometric print image region;
   generating a desired histogram based on the measured histogram;
   comparing values for starting and ending points of the measured and desired histograms to determine a difference between the starting and ending point values of the measured and desired histograms;
   using the determined difference of the starting point values to adaptively control gain adjustment, illumination, and integration time; and
   using the determined difference of the ending point values to adaptively control contrast, such that a predetermined quality of the biometric print image is produced.

2. The method of claim 1, further comprising the step of adaptively controlling at least one of a camera, based on the adaptive control of the contrast, the gain adjustment, or the integration time, and an illumination source, based on the adaptive control of the illumination, which form a portion of the system.

3. The method of claim 1, wherein said identifying a biometric print image region step comprises evaluating groups of pixels in the image to determine a standard deviation between the pixels in each of the groups to identify a grouping with a largest standard deviation, wherein the grouping with the largest standard deviation is masked as the biometric print image region.

4. The method of claim 1, wherein said identifying a biometric print image region step comprises the step of determining a gray area within the image in a shape of one of a square.

5. The method of claim 1, wherein said identifying a biometric print image region step comprises the step of determining a gray area within the image in a shape of one of a square or a rectangle.

6. The method of claim 1, further comprising:
   determining an energy value of the measured histogram;
   determining an energy value of the desired histogram;
   determining an adaptive control energy based on the energy of the measured histogram and the energy of the desired histogram;
   using the adaptive control energy to generate and to determine a threshold for a respective control parameter value for each of the contrast, gain adjustment, illumination, and integration time; and
   adjusting one or more of the respective control parameter values until a respective one of the thresholds is reached or the adaptive control energy is reached to adaptively control the system, such that the predetermined quality of the biometric print image is produced.

7. The method of claim 6, wherein the threshold is one of a maximum or minimum threshold based on whether the energy value of the measured histogram is above or below the energy value of the desired histogram.

8. The method of claim 6, further comprising:
   determining whether one or more of the respective control parameter values cannot be adjusted, based on the generated desired histogram, such that only other ones of the respective control parameter values are adjusted.

9. The method of claim 6, wherein each of the respective control parameter values is adjusted, such that once a respective one of the upper thresholds is reached a next one of the respective control parameter values is adjusted until all the respective control parameter values have been adjusted or the adaptive control energy is reached.

10. The method of claim 6, wherein said determining the adaptive control energy step comprises determining a difference between the energy value of the measured histogram and the energy value of the desired histogram.

11. The method of claim 6, wherein said determining the energy value of the desired histogram comprises the step of using an integral function.

12. The method of claim 6, wherein said determining the energy value of the measured histogram comprises the step of using an integral function.

13. A system using adaptive control to produce a print image of a predetermined quality, the system comprising:
   an illumination source that illuminates an imaging surface of a live scanner optical system, the live scanner optical system scanning a biometric object placed on the imaging surface;
   a camera that captures the print image of the biometric object placed on the imaging surface;
   a memory that stores data relating to the captured print image; and
   a controller that is configured to: (a) generate a measured histogram and a desired histogram based on the data relating to the captured print image, (b) compare values for starting and ending points of the measured and desired histograms to determine a difference between the starting and ending point values of the measured and desired histograms, (c) use the determined difference of the starting point values to adaptively control gain adjustment and integration time of a camera and to adaptively control illumination of the illumination source, and (d) use the determined difference of the ending point values to adaptively control contrast of the camera to obtain the print image with the predetermined quality.

14. The system of claim 13, wherein:

the illumination source comprises one or more light emitting diodes (LEDs); and the controller adaptively controls an intensity of each of the LEDs.

15. The system of claim 13, wherein the controller is configured to:

(a) determine an adaptive control energy;

(b) generate and determine a threshold for a respective control parameter value for each of the contrast, gain adjustment, illumination, and integration time; and (c) adjust one or more of the respective control parameter values until a respective one of the thresholds is reached or the adaptive control energy is reached to adaptively control at least one of the illumination source or the camera to obtain the print image with the predetermined quality.

16. The system of claim 15, wherein:

the adaptive control energy is based on a difference between an energy of a measured histogram and an energy of a generated desired histogram; and the threshold is one of a maximum or minimum threshold based on whether the energy value of the measured histogram is above or below the energy value of the desired histogram.

17. The system of claim 15, wherein:

the adaptive control energy is based on a difference between an energy of a measured histogram and an energy of a generated desired histogram; and the controller determines whether one or more of the respective control parameter values cannot be adjusted based on the generated desired histogram, such that only other ones of the respective control parameter values are adjusted.

18. The system of claim 15, wherein each of the respective control parameter values is adjusted, such that once a respective one of the upper thresholds is reached a next one of the respective control parameter values is adjusted until all the respective control parameter values have been adjusted or the adaptive control energy is reached.

* * * * *